United States Patent
Cheng

(10) Patent No.: US 12,162,255 B2
(45) Date of Patent: Dec. 10, 2024

(54) DISPLAY MODULE AND ELECTRONIC DEVICE

(71) Applicant: WUHAN CHINA STAR OPTOELECTRONICS SEMICONDUCTOR DISPLAY TECHNOLOGY CO., LTD., Hubei (CN)

(72) Inventor: Xueyin Cheng, Hubei (CN)

(73) Assignee: WUHAN CHINA STAR OPTOELECTRONICS SEMICONDUCTOR DISPLAY TECHNOLOGY CO., LTD., Hubei (CN)

(*) Notice: Subject to any disclaimer, the term of this patent is extended or adjusted under 35 U.S.C. 154(b) by 0 days.

(21) Appl. No.: 17/623,213

(22) PCT Filed: Dec. 22, 2021

(86) PCT No.: PCT/CN2021/140407
§ 371 (c)(1),
(2) Date: Dec. 27, 2021

(87) PCT Pub. No.: WO2023/108750
PCT Pub. Date: Jun. 22, 2023

(65) Prior Publication Data
US 2024/0025141 A1    Jan. 25, 2024

(30) Foreign Application Priority Data
Dec. 15, 2021    (CN) .......................... 202111539823.8

(51) Int. Cl.
*B32B 3/12* (2006.01)
*B32B 3/14* (2006.01)
(Continued)

(52) U.S. Cl.
CPC ................ *B32B 3/266* (2013.01); *B32B 3/12* (2013.01); *B32B 3/14* (2013.01); *B32B 3/30* (2013.01);
(Continued)

(58) Field of Classification Search
None
See application file for complete search history.

(56) References Cited

U.S. PATENT DOCUMENTS 10,651,120 B1 *  5/2020  Tsai ..................... H10K 77/111
12,035,611 B2 *  7/2024  Cheng .................. H10K 77/111
(Continued)

FOREIGN PATENT DOCUMENTS

CN    106856206 A  *  6/2017  ......... H01L 27/3244
CN    109360499 A  *  2/2019  ............. G09F 9/301
(Continued)

OTHER PUBLICATIONS

Machine Translation of KR-2020079956-A, Jul. 2020 (Year: 2020).*
(Continued)

*Primary Examiner* — Jeffrey A Vonch
(74) *Attorney, Agent, or Firm* — PV IP PC; Wei Te Chung

(57) ABSTRACT

A display module and an electronic device are provided. The display module includes a supporting member, an adhesive layer, and a display panel. The supporting member includes an unbent portion, a first bent portion, a second bent portion, and a multi-directional bent portion. The first bent portion and the second bent portion are intersected to form the multi-directional bent portion. The multi-directional bent portion is a hollow structure. The adhesive layer is arranged in the hollow structure. The display panel is arranged on the supporting member. The display panel includes a multi-
(Continued)

directional folding portion. The multi-directional folding portion is laminated with the adhesive layer.

20 Claims, 5 Drawing Sheets

(51) Int. Cl.
  *B32B 3/24*       (2006.01)
  *B32B 3/26*       (2006.01)
  *B32B 3/30*       (2006.01)
  *B32B 5/14*       (2006.01)
  *B32B 7/12*       (2006.01)
  *B32B 15/04*      (2006.01)
  *B32B 15/18*      (2006.01)
  *G09F 9/30*       (2006.01)
  *B32B 3/10*       (2006.01)
  *B32B 15/08*      (2006.01)
  *G06F 1/16*       (2006.01)
  *H04M 1/02*       (2006.01)

(52) U.S. Cl.
  CPC .............. *B32B 7/12* (2013.01); *B32B 15/043* (2013.01); *B32B 15/18* (2013.01); *G09F 9/301* (2013.01); *B32B 3/10* (2013.01); *B32B 5/142* (2013.01); *B32B 15/08* (2013.01); *B32B 2307/54* (2013.01); *B32B 2311/30* (2013.01); *B32B 2457/20* (2013.01); *G06F 1/1652* (2013.01); *H04M 1/0268* (2013.01); *Y10T 428/12361* (2015.01); *Y10T 428/24298* (2015.01); *Y10T 428/24314* (2015.01); *Y10T 428/24331* (2015.01); *Y10T 428/24339* (2015.01)

(56) References Cited

U.S. PATENT DOCUMENTS

| | | | | |
|---|---|---|---|---|
| 2013/0323521 | A1* | 12/2013 | Xia | B32B 17/10743 156/332 |
| 2016/0357052 | A1* | 12/2016 | Kim | G02F 1/133305 |
| 2017/0170417 | A1* | 6/2017 | Myung | H10K 59/12 |
| 2017/0294495 | A1* | 10/2017 | Shyu | H10K 50/8423 |
| 2017/0374750 | A1* | 12/2017 | Sun | H10K 50/84 |
| 2018/0097197 | A1* | 4/2018 | Han | H05K 5/03 |
| 2018/0150108 | A1* | 5/2018 | Song | H10K 59/40 |
| 2019/0132987 | A1* | 5/2019 | Koo | H05K 7/18 |
| 2019/0141843 | A1* | 5/2019 | Park | H05K 5/0017 |
| 2019/0165311 | A1* | 5/2019 | Lee | H10K 50/84 |
| 2019/0207141 | A1* | 7/2019 | Kim | H10K 50/841 |
| 2020/0004295 | A1* | 1/2020 | Paek | G06F 1/1652 |
| 2020/0039176 | A1* | 2/2020 | Wang | B32B 1/00 |
| 2020/0084897 | A1* | 3/2020 | Shin | H05K 5/0017 |
| 2020/0166970 | A1* | 5/2020 | Yeom | G06F 1/1618 |
| 2020/0259115 | A1* | 8/2020 | Shin | H10K 50/8426 |
| 2021/0007229 | A1* | 1/2021 | Gu | G06F 1/1601 |
| 2021/0026420 | A1* | 1/2021 | Zhang | B32B 7/12 |
| 2021/0066626 | A1* | 3/2021 | Park | G06F 1/1652 |
| 2021/0104694 | A1* | 4/2021 | Yee | H10K 77/111 |
| 2021/0151697 | A1* | 5/2021 | Cao | H10K 50/841 |
| 2021/0165447 | A1* | 6/2021 | Wang | G06F 1/1616 |
| 2021/0165454 | A1* | 6/2021 | Dong | G06F 1/1652 |
| 2021/0168929 | A1* | 6/2021 | Wang | H05K 1/028 |
| 2021/0191459 | A1* | 6/2021 | Kim | G06F 1/1637 |
| 2021/0201710 | A1* | 7/2021 | Kim | G06F 1/1616 |
| 2021/0208636 | A1* | 7/2021 | Kim | B32B 27/308 |
| 2021/0259119 | A1* | 8/2021 | Seo | G06F 1/1652 |
| 2021/0265590 | A1* | 8/2021 | Wang | H10K 50/8426 |
| 2021/0278882 | A1* | 9/2021 | Li | H04M 1/0216 |
| 2022/0043480 | A1* | 2/2022 | Seo | G09F 9/301 |
| 2022/0103670 | A1* | 3/2022 | Liao | H04M 1/0216 |
| 2022/0151082 | A1* | 5/2022 | Kim | B32B 3/16 |
| 2022/0167509 | A1* | 5/2022 | Wu | G02F 1/133305 |
| 2022/0174823 | A1* | 6/2022 | Kim | G06F 1/18 |
| 2022/0197343 | A1* | 6/2022 | Soh | G06F 1/1641 |
| 2022/0209145 | A1* | 6/2022 | Kim | B32B 15/06 |
| 2022/0238049 | A1* | 7/2022 | Min | G09F 9/301 |
| 2022/0269310 | A1* | 8/2022 | Xiong | H10K 77/111 |
| 2022/0294886 | A1* | 9/2022 | Seo | G09G 3/035 |
| 2022/0312604 | A1* | 9/2022 | Feng | B32B 3/14 |
| 2022/0322542 | A1* | 10/2022 | Wu | G06F 1/1637 |
| 2022/0404867 | A1* | 12/2022 | Shin | G06F 1/1681 |
| 2023/0049246 | A1* | 2/2023 | Wang | G06F 1/1652 |
| 2023/0070431 | A1* | 3/2023 | Li | G06F 1/1656 |
| 2023/0094074 | A1* | 3/2023 | Song | G06F 1/1641 361/679.01 |
| 2023/0111654 | A1* | 4/2023 | Li | G09F 9/301 361/807 |
| 2024/0179863 | A1* | 5/2024 | Wang | H05K 5/04 |

FOREIGN PATENT DOCUMENTS

| | | | | |
|---|---|---|---|---|
| CN | 110648593 | A * | 1/2020 | ............ G09F 9/301 |
| CN | 110689813 | A | 1/2020 | |
| CN | 110853525 | A * | 2/2020 | ............ G09F 9/301 |
| CN | 210627727 | U * | 5/2020 | |
| CN | 111402734 | A * | 7/2020 | ............ G09F 9/301 |
| CN | 210955911 | U * | 7/2020 | |
| CN | 111508357 | A * | 8/2020 | ........... G06F 1/1616 |
| CN | 111510527 | A * | 8/2020 | .......... H04M 1/0249 |
| CN | 111724678 | A * | 9/2020 | ........... G06F 1/1616 |
| CN | 111724680 | A * | 9/2020 | ........... G02B 5/3025 |
| CN | 111986571 | A * | 11/2020 | ............ G09F 9/301 |
| CN | 112037662 | A | 12/2020 | |
| CN | 113257124 | A | 8/2021 | |
| CN | 113539102 | A | 10/2021 | |
| CN | 113724631 | A | 11/2021 | |
| KR | 2019003257 | A * | 1/2019 | ........... G06F 1/1652 |
| KR | 2019069075 | A * | 6/2019 | ........... G06F 1/1616 |
| KR | 2020045584 | A * | 5/2020 | .......... G09F 15/0012 |
| KR | 2020079956 | A * | 7/2020 | ........... G06F 1/1616 |
| WO | WO-2020113784 | A1 * | 6/2020 | ............ G09F 9/301 |
| WO | WO-2020237518 | A1 * | 12/2020 | |
| WO | WO-2021008162 | A1 * | 1/2021 | ............ G09F 9/301 |
| WO | WO-2021147722 | A1 * | 7/2021 | |
| WO | 2021196870 | A1 | 10/2021 | |
| WO | WO-2022030789 | A1 * | 2/2022 | |

OTHER PUBLICATIONS

Machine Translation of CN-111402734-A, Jul. 2020 (Year: 2020).*
Machine Translation of CN-111510527-A, Aug. 2020 (Year: 2020).*
Machine Translation of CN-111724680-A, Sep. 2020 (Year: 2020).*
International Search Report in International application No. PCT/CN2021/140407, mailed on Sep. 20, 2022.
Written Opinion of the International Search Authority in International application No. PCT/CN2021/140407, mailed on Sep. 20, 2022.
Chinese Office Action issued in corresponding Chinese Patent Application No. 202111539823.8 dated Jul. 4, 2022, pp. 1-10.

* cited by examiner

DISPLAY MODULE AND ELECTRONIC DEVICE

BACKGROUND

Technical Field

The present application relates to the technical field of display, and particularly to a display module and an electronic device.

Related Art

With the constant development of flexible display module technologies, display modules of different bending radii and folding forms have attracted people's broad attention.

At present, a folding display module on the market uses a metal material as a supporting material, and then a bent region is patterned. Therefore, not only is a support provided, but also bending performance is achieved. For an overlapping-bent region formed by multi-directional bending, a patterned design is unlikely to reduce a bending stress, and meanwhile, the material is easily fatigued under bending stresses in different directions. In addition, under the influence of anisotropy of the material, a segment gap may be formed between a designed hollow region and patterned region of a supporting member in a thickness direction. In a bending process, since the middle region is hollowed and unsupported, the upper-layer material of the supporting member is subjected to different bending stresses here, and particularly under a dynamic bending condition, a display panel above the supporting member is easily peeled, resulting in a failure of the display module.

Therefore, it is necessary to propose a novel technical solution to solve the foregoing technical problems.

SUMMARY

Technical Problem

Embodiments of the present application provide a display module and an electronic device, to avoid the risk that a display module fails due to the peeling of a display panel above a supporting member.

Technical Solution

An embodiment of the present application provides a display module, including:
 a supporting member, including an unbent portion, a first bent portion, a second bent portion and a multi-directional bent portion, where the first bent portion extends in a first direction, the second bent portion extends in a second direction, the multi-directional bent portion is formed at an intersection of the first bent portion and the second bent portion, and the multi-directional bent portion is a hollow structure;
 an adhesive layer, arranged in the hollow structure; and
 a display panel, arranged on the supporting member and including a multi-directional folding portion, the multi-directional folding portion being laminated with the adhesive layer.

In the display module provided in the embodiment of the present application, the adhesive layer is arranged flush with the unbent portion.

In the display module provided in the embodiment of the present application, the hollow structure is an opening. The adhesive layer is arranged in the opening.

In the display module provided in the embodiment of the present application, the first bent portion includes a plurality of first through holes. The first through holes are arranged in the first direction. The first through holes in two adjacent rows are staggered.

The second bent portion includes a plurality of second through holes. The second through holes are arranged along the second direction. The second through holes in two adjacent columns are staggered.

In the display module provided in the embodiment of the present application, each of the first through hole and the second through hole includes at least two end portions. Each of two opposite end portions of the first through hole is shaped like an elliptic arc or a circular arc. Each two opposite end portions of the second through hole is shaped like an elliptic arc or a circular arc.

In the display module provided in the embodiment of the present application, the adhesive layer fills the first through hole. The adhesive layer fills the second through hole.

In the display module provided in the embodiment of the present application, the multi-directional bent portion includes a plurality of reticular patterns. The reticular pattern includes a first skeleton structure and a first hollow portion. The first hollow portion includes a crossed first slotted hole and second slotted hole. A length extending direction of the first slotted hole is the first direction. A length extending direction of the second slotted hole is the second direction. The first skeleton structure at a crossing corner of the first slotted hole and the second slotted hole is in smooth connection.

In the display module provided in the embodiment of the present application, Young's moduli of the first bent portion and the second bent portion are less than a Young's modulus of the unbent portion. The Young's moduli of the first bent portion and the second bent portion are greater than a Young's modulus of the multi-directional bent portion.

In the display module provided in the embodiment of the present application, the reticular patterns are arranged in an array. Two adjacent reticular patterns are connected.

In the display module provided in the embodiment of the present application, a material of the supporting member includes at least one of stainless steel, structural steel, a titanium alloy, copper, a copper alloy, an aluminum alloy, or a magnesium alloy.

In the display module provided in the embodiment of the present application, the supporting member includes:
 a first supporting layer, including a first groove formed in a region corresponding to the multi-directional bent portion;
 a bonding layer, the first supporting layer being arranged on the bonding layer; and
 a second supporting layer, arranged on a surface of the bonding layer away from the first supporting layer and including a second groove formed in a region corresponding to the multi-directional bent portion.

The hollow structure is a region corresponding to the first groove and the second groove.

The adhesive layer fills the first groove and the second groove.

In the display module provided in the embodiment of the present application, the first groove extends into a region corresponding to the first bent portion.

The second groove extends into a region corresponding to the second bent portion.

In the display module provided in the embodiment of the present application, the adhesive layer fills the first bent portion. The adhesive layer fills the second bent portion.

In the display module provided in the embodiment of the present application, the supporting member includes:
- a first supporting layer, including a first groove formed in a region corresponding to the multi-directional bent portion;
- a bonding layer, the first supporting layer being arranged on the bonding layer; and
- a second supporting layer, arranged on a surface of the bonding layer away from the first supporting layer and including a second groove formed in a region corresponding to the multi-directional bent portion.

The hollow structure is a region corresponding to the first groove and the second groove.

The adhesive layer fills the first groove.

In the display module provided in the embodiment of the present application, the adhesive layer fills the first bent portion.

In the display module provided in the embodiment of the present application, a material of the adhesive layer includes at least one of epoxy acrylate, polyurethane acrylate, polyether acrylate, polyester acrylate, and an acrylic resin.

An embodiment of the present application also provides an electronic device, including a shell and a display module. The display module is arranged in the shell. The display module includes:
- a supporting member, including an unbent portion, a first bent portion, a second bent portion and a multi-directional bent portion, where the first bent portion extends in a first direction, the second bent portion extends in a second direction, the multi-directional bent portion is formed at an intersection of the first bent portion and the second bent portion, and the multi-directional bent portion is a hollow structure;
- an adhesive layer, arranged in the hollow structure; and
- a display panel, arranged on the supporting member and including a multi-directional folding portion, the multi-directional folding portion being laminated with the adhesive layer.

In the electronic device provided in the embodiment of the present application, the hollow structure is an opening. The adhesive layer is arranged in the opening.

In the electronic device provided in the embodiment of the present application, the first bent portion includes a plurality of first through holes. The first through holes are arranged in the first direction. The first through holes in two adjacent rows are staggered.

The second bent portion includes a plurality of second through holes. The second through holes are arranged in the second direction. The second through holes in two adjacent columns are staggered.

In the electronic device provided in the embodiment of the present application, each of the first through hole and the second through hole includes at least two end portions. Each of two opposite end portions of the first through hole is shaped as an elliptic arc or a circular arc. Each two opposite end portions of the second through hole is shaped as an elliptic arc or a circular arc.

In order to make the above-mentioned contents of the present application clearer and easier to understand, detailed descriptions will be made below with preferred embodiments in combination with the drawings.

Beneficial Effects

The embodiments of the present application provide a display module and an electronic device. The display module provided in the embodiments of the present application includes a supporting member, an adhesive layer, and a display panel. The supporting member is configured to support the display panel. The supporting member includes an unbent portion, a first bent portion, a second bent portion, and a multi-directional bent portion. The first bent portion extends in a first direction. The second bent portion extends in a second direction. The first bent portion and the second bent portion are intersected to form the multi-directional bent portion. The adhesive layer is arranged in the multi-directional bent portion. The display panel is arranged on the supporting member. The display panel includes a multi-directional folding portion. The multi-directional folding portion is laminated with the adhesive layer. According to the embodiments of the present application, the adhesive layer is arranged in the multi-directional bent portion of the supporting member, so that segment gaps between the unbent portion, the first bent portion, the second bent portion and the multi-directional bent portion are avoided. The multi-directional folding portion of the display panel is laminated with the adhesive layer, so that bending stresses at the first bent portion, the second bent portion and the multi-directional bent portion are kept the same in a dynamic bending process of the display module. Therefore, the risk that the display module fails due to the peeling of the display panel above the supporting member is avoided.

DETAILED DESCRIPTION

Figure 1:
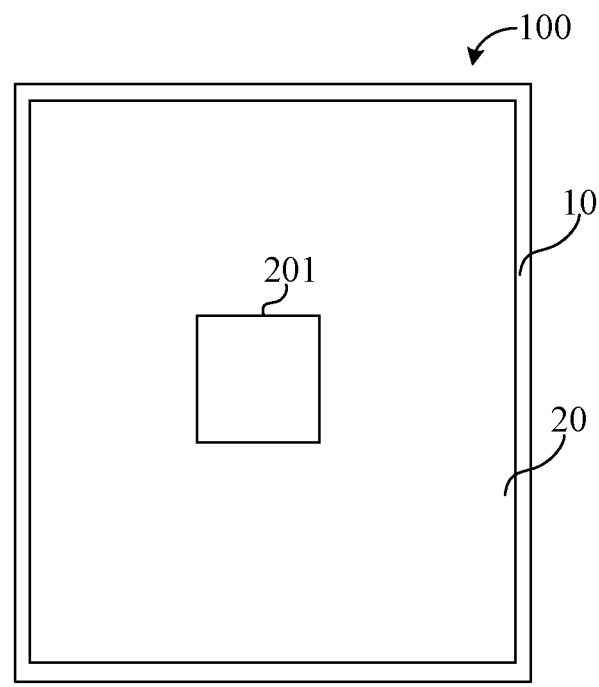
FIG. 1 is a schematic diagram of a plane structure of a display module according to an embodiment of the present application.

In order to make the objectives, technical solutions and advantages of the present application clearer, the present application will further be described below in combination with the drawings in detail. References are made to the drawings where the same element signs represent the same element. The following descriptions are made based on shown specific embodiments of the present application and should not be regarded as limiting undetailed other specific embodiments of the present application. Term "embodiment" used in the specification refers to an instance, an example or an illustrative example.

In the descriptions of the present application, it is to be noted that, unless otherwise definitely specified and limited, terms "mount", "mutually connect" and "connect" should be broadly understood. For example, the terms may refer to fixed connection, detachable connection, or integral connection. Alternatively, the terms may refer to mechanical connection or electrical connection. Alternatively, the terms may refer to direct connection, indirect connection through a medium, or communication in two components. Those of ordinary skill in the art may understand the specific meanings of these terms in the present application according to specific conditions.

The embodiments of the application provide a display module and an electronic device. Detailed descriptions will be made below respectively. It is to be noted that the order of description of the following embodiments is not intended to limit the preferred order of the embodiments.

The display module includes a supporting member, an adhesive layer, and a display panel. The supporting member is configured to support the display panel. The supporting member includes an unbent portion, a first bent portion, a second bent portion, and a multi-directional bent portion. The multi-directional bent portion is a hollow structure. The first bent portion extends in a first direction. The second bent portion extends in a second direction. The first bent portion and the second bent portion are intersected to form the multi-directional bent portion. The adhesive layer is arranged in the hollow structure. The display panel is arranged on the supporting member. The display panel includes a multi-directional folding portion. The multi-directional folding portion is laminated with the adhesive layer.

According to the embodiments of the present application, the adhesive layer is arranged in a hollow region of the supporting member, so that segment gaps between the unbent portion, the first bent portion, the second bent portion and the multi-directional bent portion are avoided. The multi-directional folding portion of the display panel is laminated with the adhesive layer, so that bending stresses at the first bent portion, the second bent portion and the multi-directional bent portion are kept the same in a dynamic bending process of the display module. Therefore, the risk that the display module fails due to the peeling of the display panel above the supporting member is avoided.

It is to be noted that the display module may be, but not limited to, a liquid crystal display, an organic light-emitting diode display panel, a Micro light-emitting diode display panel, or a Mini light-emitting diode display panel.

The display module provided in the present application will be described below in detail with specific embodiments.

Figure 2:
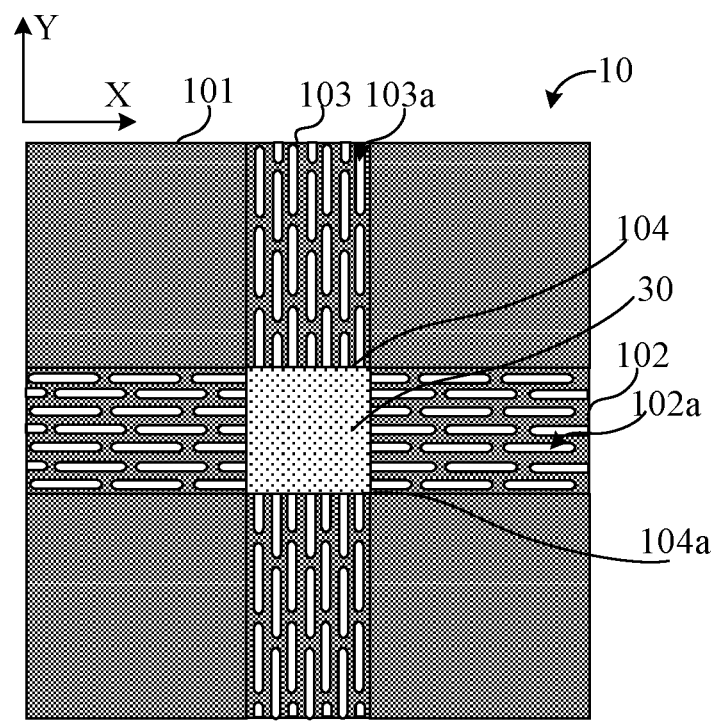
FIG. 2 is a schematic diagram of a plane structure of a supporting member according to a first embodiment of the present application.
Figure 3:
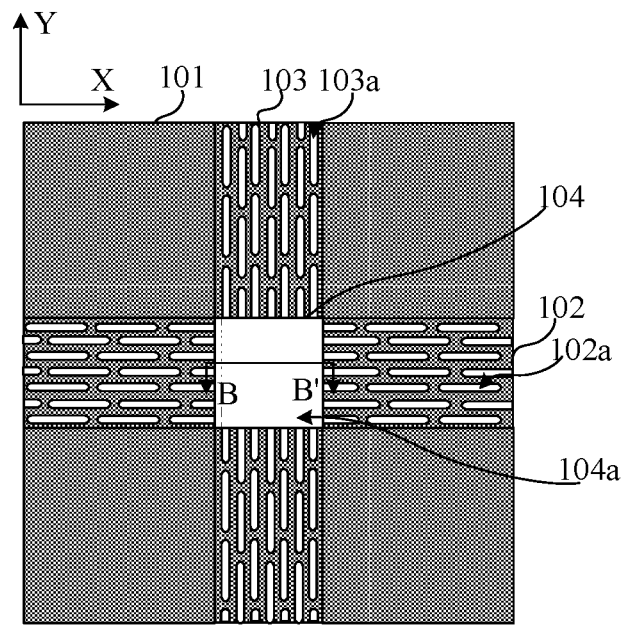
FIG. 3 is a schematic plane view of an opening of a supporting member according to a first embodiment of the present application.
Figure 4:
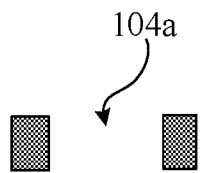
FIG. 4 is a sectional view along a B-B' direction in FIG. 3.

Referring to FIG. 1, FIG. 2, FIG. 3 and FIG. 4, FIG. 1 is a schematic diagram of a plane structure of a display module according to an embodiment of the present application. FIG. 2 is a schematic diagram of a plane structure of a supporting member according to a first embodiment of the present application. FIG. 3 is a schematic structure of a plane structure of an opening of a supporting member according to a first embodiment of the present application. FIG. 4 is a sectional view along a B-B' direction in FIG. 3.

The display module 100 includes a supporting member 10, an adhesive layer and a display panel 20. The supporting member 10 is configured to support the display panel 20. The supporting member 10 includes an unbent portion 101, a first bent portion 102, a second bent portion 103, and a multi-directional bent portion 104. The multi-directional bent portion 104 is a hollow structure. The first bent portion 102 extends in a first direction X. The second bent portion 103 extends in a second direction Y. The first bent portion 102 and the second bent portion 103 are intersected to form the multi-directional bent portion 104. The adhesive layer 30 is arranged in a hollow region. The display panel 20 is arranged on the supporting member 10. The display panel 20 includes a multi-directional folding portion 201. The multi-directional folding portion 201 is laminated with the adhesive layer 30.

It is to be noted that an included angle is formed between the first direction X and the second direction Y in the embodiment of the present application. The included angle between the first direction X and the second direction Y is larger than 0 degree and smaller than 180 degrees. The embodiment of the present application is described with, but not limited to, an included angle of 90 degrees between the first direction X and the second direction Y as an example.

It is to be understood that the hollow structure in the embodiment of the present application is formed by patterning the multi-directional bent portion 104 corresponding to the supporting member 10.

Further, the hollow structure is an opening 104a. The adhesive layer 30 is arranged in the opening 104a. The adhesive layer 30 is arranged flush with the unbent portion 101.

It is to be understood that the opening 104a as described in the embodiment of the present application is an open pore structure formed by patterning the hollow structure corresponding to the multi-directional bent portion 104. It is to be understood that the opening 104a is an integrated hollow portion. In the embodiment of the present application, the adhesive layer 30 is arranged in the hollow structure of the supporting member 10, and the unbent portion 101 is arranged flush with the adhesive layer 30. Therefore, segment gaps between the unbent portion 101, the first bent portion 102, the second bent portion 103 and the multi-directional bent portion 104 are avoided. The multi-directional folding portion 201 of the display panel 20 is laminated with the adhesive layer 30, so that bending stresses at the first bent portion 102, the second bent portion 103 and the multi-directional bent portion 104 are kept the same in a dynamic bending process of the display module 100. Therefore, the risk that the display module 100 fails due to the peeling of the display panel 20 above the supporting member 10 is avoided.

In the display module 100 provided in the embodiment of the present application, the first bent portion 102 includes a plurality of first through holes 102a. The first through holes 102a are arranged along the first direction X. The first through holes 102a in two adjacent rows are staggered. The second bent portion 103 includes a plurality of second through holes 103a. The second through holes 103a are arranged along the second direction Y. The second through holes 103a in two adjacent columns are staggered. Each of the first through hole 102a and the second through hole 103a includes at least two end portions. Each of two opposite end portions of the first through hole 102a is shaped as an elliptic arc or a circular arc. Each two opposite end portions of the second through hole 103a is shaped as an elliptic arc or a circular arc.

In the embodiment of the present application, the supporting member 10 has different bending performance at different bent portions. Therefore, the first bent portion 102 is patterned to form different reticular patterns respectively. The reticular patterns of different bent portions have different distributions and fitting relationships. The first through holes 102a are formed in the first bent portion 102 to bend the supporting member 10 along the first direction X. The second through holes 103a are formed in the second bent portion 103 to bend the supporting member 10 along the second direction Y. In addition, in order to avoid the phenomenon of stress concentration during bending deformation, each of two opposite end portions of the first through hole 102a is shaped like an elliptic arc or a circular arc, and each two opposite end portions of the second through hole 103a is shaped like an elliptic arc or a circular arc.

It is to be noted that, in the embodiment of the present application, each of the first through hole 102a and the second through hole 103a may be shaped into a long-strip structure. When shaped into a long-strip structure, each of the first through hole 102a and the second through hole 103a includes two end portions, and each of two opposite ends of the first through hole 102a and the second through hole 103a is shaped like an elliptic arc or a circular arc.

In some embodiments, each of the first through hole 102a and the second through hole 103a is shaped into a cross. When shaped into a cross, each of the first through hole 102a and the second through hole 103a may be formed by two intersected long-strip structures.

It is to be understood that, in the embodiment of the present application, the first through hole 102a, the second through hole 103a and the opening 104a may be formed by patterning the supporting member 10.

In the embodiment of the present application, a material of the supporting member 10 includes at least one of stainless steel, structural steel, a titanium alloy, copper, a copper alloy, an aluminum alloy, or a magnesium alloy. In the embodiment of the present application, a metal material is used as the material of the supporting member 10. Therefore, the rigidity of the supporting member 10 is ensured, and relatively high supporting performance is achieved for the display panel 20.

Figure 5:
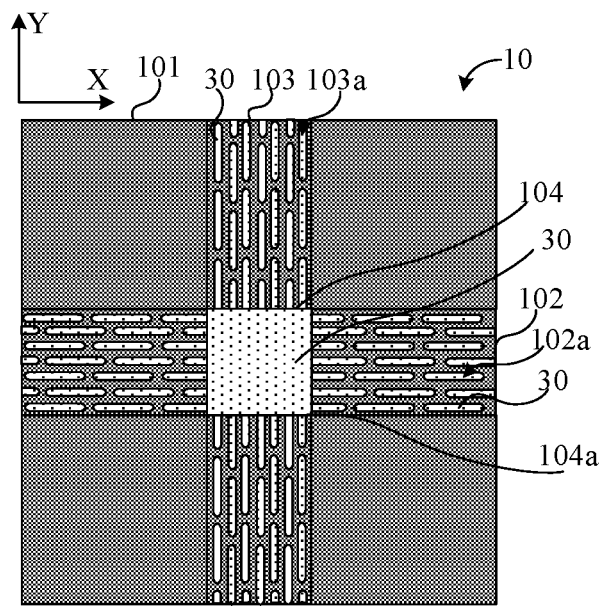
FIG. 5 is a schematic diagram of a plane structure of a supporting member according to a second embodiment of the present application.

Referring to FIG. 1 and FIG. 5, FIG. 5 is a schematic diagram of a plane structure of a supporting member according to a second embodiment of the present application. The supporting member 10 provided in the second embodiment of the present application differs from the supporting member 10 provided in the first embodiment as follows. The adhesive layer 30 also fills the first through hole 102a and the second through hole 103a.

In the embodiment of the present application, the adhesive layer 30 is also arranged in the first through hole 102a and the second through hole 103a such that the multi-directional bent portion 104 is connected more uniformly with the first bent portion 102 and the second bent portion 103. Therefore, no bubbles are generated when the display panel 20 is laminated, and the risk that the display module 100 fails in the dynamic bending process is further avoided.

It is to be noted that, in some embodiments, the adhesive layer 30 fills at least one of the first bent portion 102 and the second bent portion 103.

Figure 6:
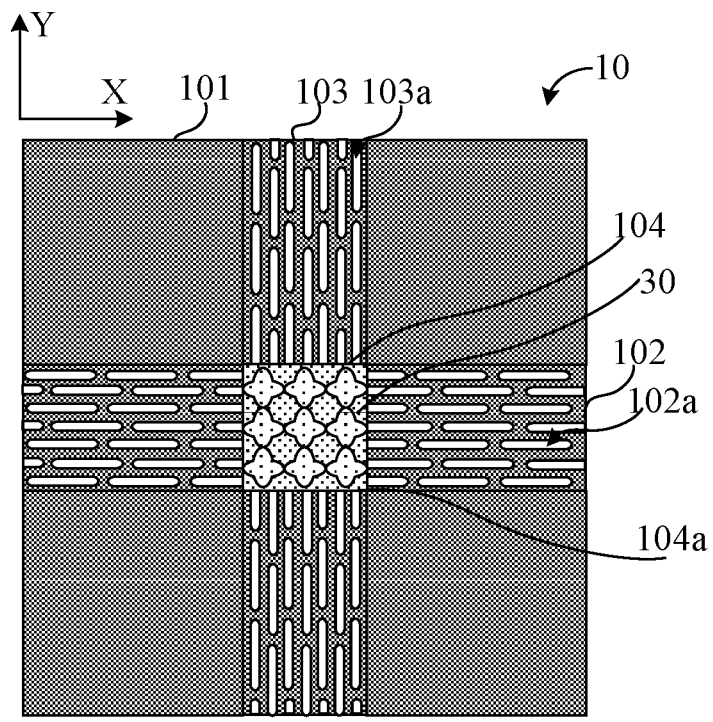
FIG. 6 is a schematic diagram of a plane structure of a supporting member according to a third embodiment of the present application.
Figure 7:
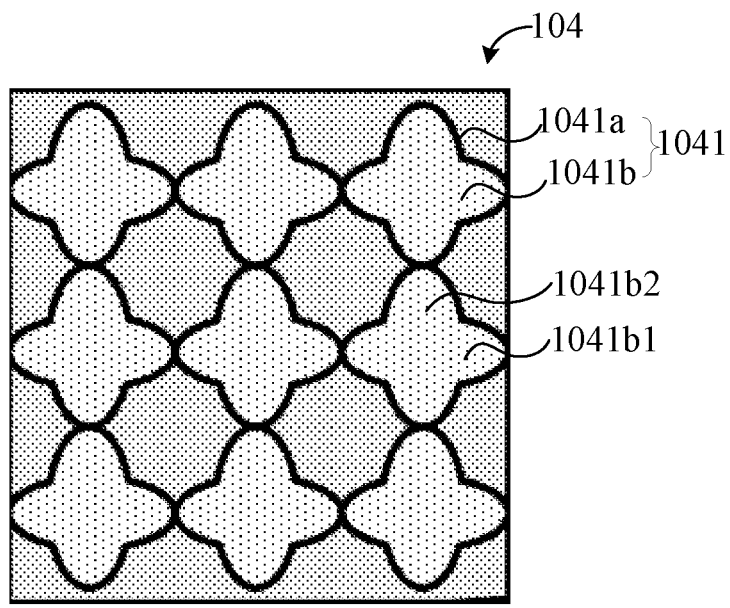
FIG. 7 is a schematic plane view of a multi-directional bent portion in FIG. 6.

Referring to FIG. 1, FIG. 6 and FIG. 7, FIG. 6 is a schematic diagram of a plane structure of a supporting member according to a third embodiment of the present application. FIG. 7 is a schematic plane view of a multi-directional bent portion in FIG. 6. The supporting member 10 provided in the third embodiment of the present application differs from the supporting member 10 provided in the first embodiment as follows. The multi-directional bent portion 104 includes a plurality of reticular patterns 1041. The reticular pattern 1041 includes a first skeleton structure 1041a and a first hollow portion 1041b. The first hollow portion 1041b includes a crossed first slotted hole 1041b1 and second slotted hole 1041b2. A length extending direction of the first slotted hole 1041b1 is the first direction X. A length extending direction of the second slotted hole 1041b2 is the second direction Y. The first skeleton structure 1041a at a crossing corner of the first slotted hole 1041b1 and the second slotted hole 1041b2 is in smooth connection. The reticular patterns 1041 are arranged in an array. Two adjacent reticular patterns 1041 are connected. Young's moduli of the first bent portion 102 and the second bent portion 103 are less than a Young's modulus of the unbent portion 101. The Young's moduli of the first bent portion 102 and the second bent portion 103 are greater than a Young's modulus of the multi-directional bent portion 104.

The adhesive layer 30 fills the first bent portion 102 and the second bent portion 103. A material of the adhesive layer 30 includes at least one of epoxy acrylate, polyurethane acrylate, polyether acrylate, polyester acrylate, and an acrylic resin.

In the supporting member 10 provided in the embodiment of the present application, the multi-directional bent portion 104 includes the reticular patterns 1041 arranged in an array. The multi-directional bent portion 104 is located at an overlapping position of the first bent portion 102 and the second bent portion 103, and needs to be bendable in the two intersected directions, i.e., the first direction X and the second direction Y. Therefore, the reticular pattern of the multi-directional bent portion 104 is designed into an axially asymmetric pattern symmetric about a bending axis of the first bent portion 102 and a bending axis of the second bent portion 103. In such a design manner, the reticular pattern 1041 may be bent along the bending axis in the first direction X and the bending axis in the second direction Y, thereby achieving folding forms of the two bending directions and meeting a functional requirement about the bending flexibility. In addition, the Young's moduli of the first bent portion 102 and the second bent portion 103 are higher than the Young's modulus of the multi-directional bent portion 104, so that the elastic modulus of the multi-directional bent portion 104 is improved.

Figure 8:
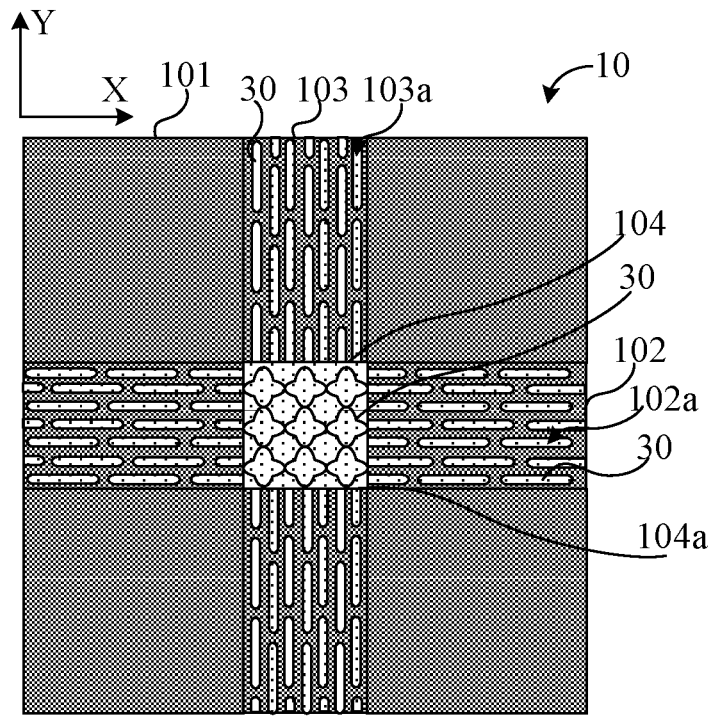
FIG. 8 is a schematic diagram of a plane structure of a supporting member according to a fourth embodiment of the present application.
Figure 9:
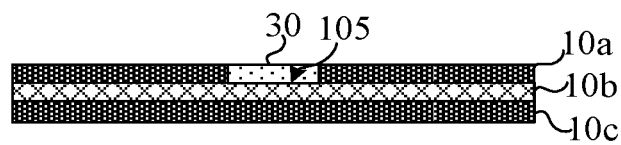
FIG. 9 is a front view of a supporting member according to a fifth embodiment of the present application.

Referring to FIG. 1 and FIG. 8, FIG. 8 is a schematic diagram of a plane structure of a supporting member according to a fourth embodiment of the present application. The supporting member 10 provided in the fourth embodiment differs from the supporting member 10 provided in the third embodiment as follows. The adhesive layer 30 also fills the first through hole 102a and the second through hole 103a.

The adhesive layer 30 fills the first bent portion 102 and the second bent portion 103. A material of the adhesive layer 30 includes at least one of epoxy acrylate, polyurethane acrylate, polyether acrylate, polyester acrylate, and an acrylic resin.

In the embodiment of the present application, the adhesive layer 30 is also arranged in the first through hole 102a and the second through hole 103a such that the multi-directional bent portion 104 is connected more uniformly with the first bent portion 102 and the second bent portion 103. Therefore, no bubbles are generated when the display panel 20 is laminated, and the risk that the display module 100 fails in the dynamic bending process is further avoided.

It is to be noted that, in some embodiments, the adhesive layer 30 fills at least one of the first bent portion 102 and the second bent portion 103.

Figure 10:
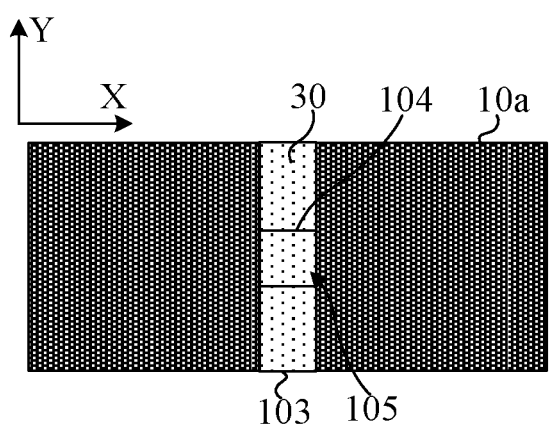
FIG. 10 is a schematic diagram of a plane structure of a first supporting layer of a supporting member according to a fifth embodiment of the present application.
Figure 11:
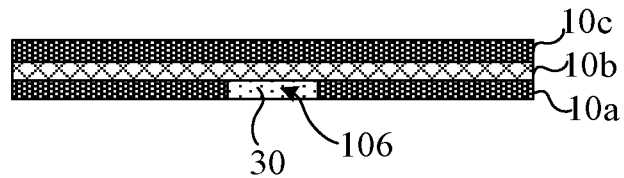
FIG. 11 is a left view of a supporting member according to a fifth embodiment of the present application.
Figure 12:
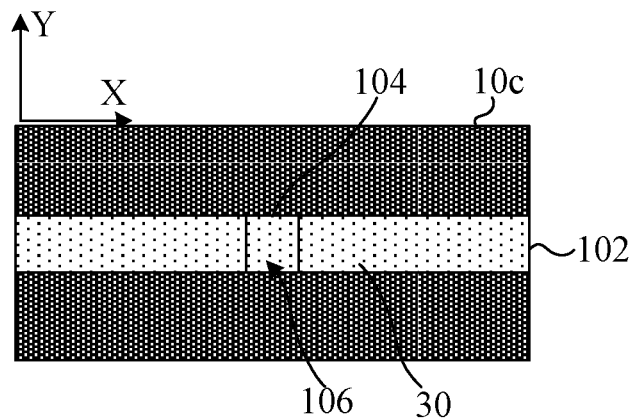
FIG. 12 is a schematic diagram of a plane structure of a second supporting layer according to a fifth embodiment of the present application.

Referring to FIG. 9 to FIG. 12, FIG. 9 is a front view of a supporting member according to a fifth embodiment of the present application. FIG. 10 is a schematic diagram of a plane structure of a first supporting layer of a supporting member according to a fifth embodiment of the present application. FIG. 11 is a left view of a supporting member according to a fifth embodiment of the present application. FIG. 12 is a schematic diagram of a plane structure of a second supporting layer according to a fifth embodiment of the present application.

The supporting member 10 includes an unbent portion 101, a first bent portion 102, a second bent portion 103, and a multi-directional bent portion 104. The first bent portion 102 extends in a first direction X. The second bent portion 103 extends in a second direction Y. The first bent portion 102 and the second bent portion 103 are intersected to form the multi-directional bent portion 104. The multi-directional bent portion 104 is a hollow structure. The adhesive layer 30 is arranged in the hollow structure. The supporting member 10 includes a first supporting layer 10a, a bonding layer 10b, and a second supporting layer 10c. A first groove 105 is formed in a region of the first supporting layer 10a corresponding to the hollow structure. The first supporting layer 10a is arranged on the bonding layer 10b. The second supporting layer 10c is arranged on a surface of the bonding layer 10b away from the first supporting layer 10a. A second groove 106 is formed in a region of the second supporting layer 10c corresponding to the hollow structure. The adhesive layer 30 fills the first groove 105 and the second groove 106.

It is to be understood that the hollow structure is a region corresponding to the first groove 105 and the second groove 106.

Further, the first groove 105 extends into a region corresponding to the first bent portion 102. The second groove 106 extends into a region corresponding to the second bent portion 103.

It is to be understood that, in the embodiment of the present application, the first groove 105 and the second groove 106 extends into the regions corresponding to the first bent portion 102 and the second bent portion 103 respectively, and the regions corresponding to the first bent portion 102 and the second bent portion 103 are filled with a glue solution or cured glue. As such, the formation of a segment gap between the unbent portion 101 and each of the first bent portion 102, the second bent portion 103 and the multi-directional bent portion 104 is avoided. Therefore, the risk that the display module 100 fails due to the peeling of the display panel 20 above the supporting member 10 is avoided.

It is to be noted that the first groove 105 may be formed by patterning the first supporting layer 10a. The second groove 106 may be formed by patterning the second supporting layer 10c.

Further, the adhesive layer 30 fills the first bent portion 102 and the second bent portion 103. A material of the adhesive layer 30 includes at least one of epoxy acrylate, polyurethane acrylate, polyether acrylate, polyester acrylate, and an acrylic resin.

It is to be understood that the first supporting layer 10a and the second supporting layer 10c may be bonded by the bonding layer 10b without peeling. The first reason is that the bonding layer 10b bonds portions of the first supporting layer 10a and the second supporting layer 10c corresponding to the unbent portion 101 and no bending operation is needed. The bonding layer 10b is made of an organic polymeric material, and may provide stresses for bending operations at the first bent portion 102, the second bent portion 103 and the multi-directional bent portion 104.

It is to be understood that a stacked design is used for the supporting member 10 in the embodiment of the present application. That is, the first supporting layer 10a and the second supporting layer 10c are bonded to upper and lower surfaces of the bonding layer 10b respectively, and folding regions of the first supporting layer 10a and the second supporting layer 10c corresponding to the display panel are hollowed. Therefore, the supporting member 10 is endowed with bending performance. Since the supporting member is structured into a stacked design, each bent portion corresponds to a thickness of only one supporting layer. Therefore, the thickness of the supporting layer corresponding to each bent portion of the supporting member 10 is reduced, and a bending stress at the corresponding bent portion is further reduced to alleviate the problem of a fracture risk of a metal supporting member in a bending process of an existing display module. The formation of the hollow regions (the first bent portion 102, the second bent portion 103 and the multi-directional bent portion 104) causes the formation of a segment gap between the unbent portion 101 and each of the first bent portion 102, the second bent portion 103 and the multi-directional bent portion 104 and further results in the risk that the display module fails. Therefore, in the embodiment of the present application, the adhesive layer 30 is arranged at the first bent portion 102, the second bent portion 103 and the multi-directional bent portion 104. As such, segment gaps between the unbent portion 101, the first bent portion 102, the second bent portion 103 and the multi-directional bent portion 104 are avoided. The multi-directional folding portion 201 of the display panel 20 is laminated with the adhesive layer so that bending stresses at the first bent portion 102, the second bent portion 103 and the multi-directional bent portion 104 are kept the same in a dynamic bending process of the display module 100. Therefore, the risk that the display module 100 fails due to the peeling of the display panel 20 above the supporting member 10 is avoided.

It is to be understood that, in some embodiments, the adhesive layer 30 fills the first groove 105 or the second groove 106. That is, the adhesive layer 30 may only fill the groove of a portion laminated with the display panel 20 and corresponding to the multi-directional folding portion. Therefore, a filling material may be saved, and the production cost of the display module may be reduced.

In some embodiments, the adhesive layer fills the first bent portion 102 or the second bent portion 103. That is, the adhesive layer 30 may only fill the groove on a surface laminated with the display panel. Therefore, a filling material may be saved, and the production cost of the display module may be reduced.

It is to be noted that, in the embodiments disclosed in the present application, the number of the first bent portion of the supporting member may be one, two, or more than two. A first bent portion refers to is defined as follows. A first strip-shaped portion extending in the first direction X is formed in the first direction X from a first side edge of the unbent portion to a second side edge of the unbent portion opposite to the first side edge. A multi-directional bent portion is formed at an intersection of the first strip-shaped portion and the second bent portion. A region of the first strip-shaped portion except the multi-directional bent portion is a first bent portion. Similarly, the number of the second bent portion may be one, two, or more than two. Each second bent portion is defined as follows. A second strip-shaped portion extending in the second direction is formed in the second direction Y from a third side edge of the unbent portion to a fourth side edge of the unbent portion opposite to the third side edge. A multi-directional bent portion is formed at an intersection of the second strip-shaped portion and the second bent portion. A portion of the second strip-shaped portion except the multi-directional bent portion is a second bent portion.

Figure 13:
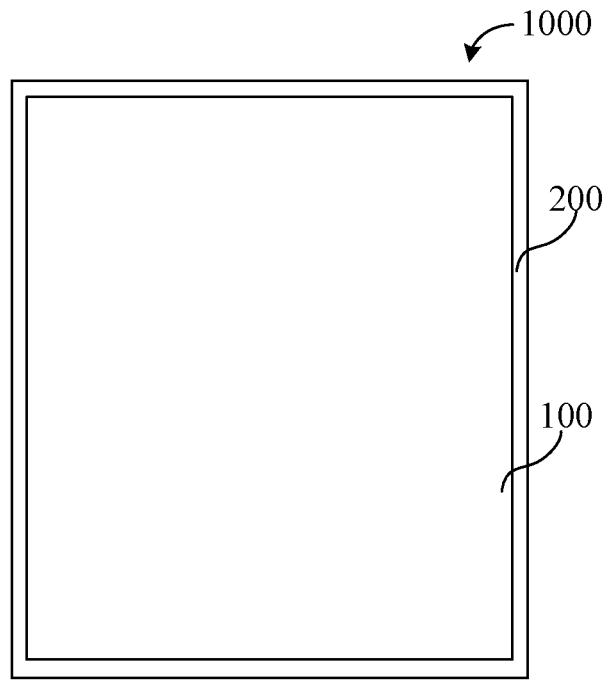
FIG. 13 is a schematic diagram of a plane structure of an electronic device according to an embodiment of the present application.

Referring to FIG. 13, an embodiment of the present application also provides an electronic device. The electronic device 1000 may be a display device such as a mobile phone, a tablet computer, a notebook computer, and a television. The electronic device 1000 includes a shell 200 and a display module 100 arranged in the shell 200. The display module may be the display module 100 in any one of the above-mentioned embodiments. A specific structure of the display module 100 may refer to the descriptions in the above-mentioned embodiments, and will not be elaborated herein.

The embodiments of the present application provide a display module and an electronic device. The display module provided in the embodiments of the present application includes a supporting member, an adhesive layer, and a display panel. The supporting member is configured to support the display panel. The supporting member includes an unbent portion, a first bent portion, a second bent portion, and a multi-directional bent portion. The first bent portion extends in a first direction. The second bent portion extends in a second direction. The first bent portion and the second bent portion are intersected to form the multi-directional bent portion. The adhesive layer is arranged in the multi-directional bent portion. The display panel is arranged on the supporting member. The display panel includes a multi-directional folding portion. The multi-directional folding portion is laminated with the adhesive layer. According to the embodiments of the present application, the adhesive layer is arranged in the multi-directional bent portion of the supporting member, so that segment gaps between the unbent portion, the first bent portion, the second bent portion and the multi-directional bent portion are avoided. The multi-directional folding portion of the display panel is laminated with the adhesive layer, so that bending stresses at the first bent portion, the second bent portion and the multi-directional bent portion are kept the same in a dynamic bending process of the display module. Therefore, the risk that the display module fails due to the peeling of the display panel above the supporting member is avoided.

In summary, although the present application has been disclosed above through the preferred embodiments, the preferred embodiments are not intended to limit the present application. Those of ordinary skill in the art may make various modifications and embellishments without departing from the spirit and scope of the present application. Therefore, the scope of protection of the present application is subject to the scope defined by the claims.

What is claimed is:

1. A display module, comprising:
a supporting member, comprising non-bending portions, a first bending portion, a second bending portion, and a multi-directional bending portion in a plan view, wherein the first bending portion extends in a first direction in the plan view, the second bending portion extends in a second direction in the plan view, and the multi-directional bending portion is formed at an intersection of the first bending portion and the second bending portion in the plan view, the multi-directional bending portion is a hollow structure,
wherein the supporting member further comprises a first supporting layer, a bonding layer, and a second supporting layer stacked in a vertical direction perpendicular to the first direction and the second direction in a section view, the first supporting layer is arranged on a first surface of the bonding layer, the second supporting layer is arranged on a second surface of the bonding layer away from the first supporting layer and opposite to the first surface, the bonding layer is configured to bond the first supporting layer and the second supporting layer,
wherein the first supporting layer comprises a first groove formed therethrough in a region corresponding to the multi-directional bending portion and extending in the first direction into a region corresponding to the first bending portion, the second supporting layer comprises a second groove formed therethrough in a region corresponding to the multi-directional bending portion and extending in the second direction into a region corresponding to the second bending portion, wherein the region of the first groove corresponding to the multi-directional bending portion and the region of the second groove corresponding to the multi-directional bending portion forms the hollow structure the first supporting layer further comprises a non-groove portion corresponding to the second bending region where the first supporting layer overlaps the second groove, the second supporting layer further comprises a non-groove portion corresponding to the first bending region where the second supporting layer overlaps the first groove;
an adhesive layer, arranged on the first surface and the second surface of the bonding layer and filling at least one of the first groove and the second groove to form a flat surface of the supporting member; and
a display panel, arranged on the flat surface of the supporting member and comprising a multi-directional folding portion, wherein the multi-directional folding portion is laminated with the adhesive layer.

2. The display module according to claim 1, wherein the angle between the first direction and the second direction in the plan view is 90 degrees.

3. The display module according to claim 1, wherein the first groove is a continuous opening through the first supporting layer and the second groove is a continuous opening through the second supporting layer.

4. The display module according to claim 1, wherein the first groove portion extending in the first direction into the region corresponding to the first bending portion is patterned comprising a plurality of first through holes, the first through holes are arranged along the first direction, and the first through holes in two adjacent rows are staggered; and
the second groove portion extending in the second direction into the region corresponding to the second bending portion is patterned comprising a plurality of second through holes, the first through holes are arranged along the second direction, and the second through holes in two adjacent columns are staggered.

5. The display module according to claim 4, wherein each of the first through holes and each of the second through holes comprises at least two end portions, each of the two opposite end portions is shaped like an elliptical arc.

6. The display module according to claim 5, wherein each of the first through holes and each of the second through holes comprises a long-strip structure disposed between and connecting the two opposing end portions.

7. The display module according to claim 4, wherein the adhesive layer fills the first through holes, and the adhesive layer fills the second though holes.

8. The display module according to claim 4, wherein the first groove portion in the region corresponding to the multi-directional bending portion and/or the second groove portion in the region corresponding to the multi-directional bending portion is/are patterned comprising a plurality of reticular patterns, each reticular pattern comprises a skeleton structure and a hollow portion; the hollow portion comprises a crossed first slotted hole and second slotted hole; a length extending direction of the first slotted hole is the first direction, and a second extending direction of the second slotted hole is the second direction, and the skeleton structure defines a crossing corner of the first slotted hole and the second slotted hole.

9. The display module according to claim 8, wherein the Young's modulus of the first bending portion and the second bending portion are less than a Young's modulus of the non-bending portions, and the Young's moduli of the first bending portion and the second bending portion are greater than a Young's modulus of the multi-directional bending portion.

10. The display module according to claim 8, wherein the reticular patterns are arranged in an array, and adjacent ones of the reticular patterns are connected.

11. The display module according to claim 1, wherein the multi-directional bending portion is one multi-directional bending portion of a plurality of multi-directional bending portions, wherein the first bending portion is one first bending portion of a plurality of bending portions disposed along the second direction in the plan view and/or the second bending portion is one second bending portion of a plurality of bending portions disposed along the first direction in the plan view, each multi-directional bending portion of the plurality of multi-directional bending portions being disposed at each respective intersection of a first respective bending portion and a second respective bending portion.

12. The display module according to claim 1, wherein a material of the first and second supporting layers of the supporting member comprises at least one of stainless steel, structural steel, a titanium alloy, copper, a copper alloy, an aluminum alloy, or a magnesium alloy.

13. The display module according to claim 1, wherein a material of the adhesive layer comprises at least one of epoxy acrylate, polyurethane acrylate, polyether acrylate, polyester acrylate, or an acrylic resin.

14. The display module according to claim 1, wherein the display module is a liquid crystal display panel, an organic light-emitting diode display panel, a mini light-emitting diode display panel, or a micro light-emitting diode display panel.

15. An electronic device, comprising a shell and a display module, wherein the display module is arranged in the shell, and the display module comprises:
a supporting member, comprising non-bending portions, a first bending portion, a second bending portion, and a multi-directional bending portion in a plan view, wherein the first bending portion extends in a first direction in the plan view, the second bending portion extends in a second direction in the plan view, and the multi-directional bending portion is formed at an intersection of the first bending portion and the second bending portion in the plan view, the multi-directional bending portion is a hollow structure,
wherein the supporting member further comprises a first supporting layer, a bonding layer, and a second supporting layer stacked in a vertical direction perpendicular to the first direction and the second direction in a section view, the first supporting layer is arranged on a first surface of the bonding layer, the second supporting layer is arranged on a second surface of the bonding layer away from the first supporting layer and opposite to the first surface, the bonding layer is configured to bond the first supporting layer and the second supporting layer,
wherein the first supporting layer comprises a first groove formed therethrough in a region corresponding to the multi-directional bending portion and extending in the first direction into a region corresponding to the first bending portion, the second supporting layer comprises a second groove formed therethrough in a region corresponding to the multi-directional bending portion and extending in the second direction into a region corresponding to the second bending portion, wherein the region of the first groove corresponding to the multi-directional bending portion and the region of the second groove corresponding to the multi-directional bending portion forms the hollow structure the first supporting layer further comprises a non-groove portion corresponding to the second bending region where the first supporting layer overlaps the second groove, the second supporting layer further comprises a non-groove portion corresponding to the first bending region where the second supporting layer overlaps the first groove;
an adhesive layer, arranged on the first surface and the second surface of the bonding layer and filling at least one of the first groove and the second groove to form a flat surface of the supporting member; and
a display panel, arranged on the flat surface of the supporting member and comprising a multi-directional folding portion, the multi-directional folding portion being laminated with the adhesive layer.

16. The electronic device according to claim 15, wherein the first groove portion extending in the first direction into the region corresponding to the first bending portion is patterned comprising a plurality of first through holes, the first through holes are arranged along the first direction, and the first through holes in two adjacent rows are staggered; and
the second groove portion extending in the second direction into the region corresponding to the second bending portion is patterned comprising a plurality of second through holes, the first through holes are arranged along the second direction, and the second through holes in two adjacent columns are staggered.

17. The electronic device according to claim 16, wherein each of the first through holes and each of the second through holes comprises at least two end portions, each of the two opposite end portions is shaped like an elliptical arc or a circular arc.

18. The electronic device according to claim 16, wherein the first groove portion in the region corresponding to the multi-directional bending portion and/or the second groove portion in the region corresponding to the multi-directional bending portion is/are patterned comprising a plurality of reticular patterns, each reticular pattern comprises a skeleton structure and a hollow portion; the hollow portion comprises a crossed first slotted hole and second slotted hole; a length extending direction of the first slotted hole is the first direction, and a second extending direction of the second slotted hole is the second direction, and the skeleton defines a crossing corner of the first slotted hole and the second slotted hole, wherein the reticular patterns are arranged in an array, and adjacent ones of the reticular patterns are connected.

19. The electronic device according to claim 18, wherein the Young's modulus of the first bending portion and the second bending portion are less than a Young's modulus of the non-bending portions, and the Young's moduli of the first bending portion and the second bending portion are greater than a Young's modulus of the multi-directional bending portion.

20. The electronic device according to claim 15, wherein the display module is a liquid crystal display panel, an organic light-emitting diode display panel, a mini light-emitting diode display panel, or a micro light-emitting diode display panel.

* * * * *